350-452 SR

1/5/88 XR 4,717,821

United States Patent [19]

Messiou

[11] Patent Number: 4,717,821

[45] Date of Patent: Jan. 5, 1988

[54] FLAT WIDE-ANGLE LENS ARRAY WITH A COMMON FOCUS

[75] Inventor: Antoine Y. Messiou, Southampton, England

[73] Assignee: U.S. Philips Corporation, New York, N.Y.

[21] Appl. No.: 842,975

[22] Filed: Mar. 24, 1986

[30] Foreign Application Priority Data

Mar. 29, 1985 [GB] United Kingdom ................. 8508205

[51] Int. Cl.[4] .......................... G01V 9/04; G02B 3/08

[52] U.S. Cl. ...................................... 250/221; 350/452

[58] Field of Search ............... 250/342, 353, 221, 216; 350/452, 451

[56] References Cited

U.S. PATENT DOCUMENTS

| | | | |
|---|---|---|---|
| 3,547,546 | 12/1970 | Schier | 350/162 |
| 4,076,384 | 2/1978 | Deml et al. | 350/452 |
| 4,321,594 | 3/1982 | Galvin et al. | 350/452 |
| 4,367,016 | 1/1983 | Willhelm | 350/452 |
| 4,535,240 | 8/1985 | Vigurs | 350/452 |

FOREIGN PATENT DOCUMENTS

| | | |
|---|---|---|
| 1504283 | 3/1978 | United Kingdom . |
| 2165639 | 4/1986 | United Kingdom . |

OTHER PUBLICATIONS

Longhurst, R. S. *Geometrical and Physical Optics*, Second Edition, p. 283, John Wiley & Sons Inc., New York (1967).

*Primary Examiner*—Edward P. Westin
*Assistant Examiner*—Charles Wieland
*Attorney, Agent, or Firm*—Marc D. Schechter

[57] ABSTRACT

Array of Fresnel lenses moulded in a single sheet of plastic 29 are used in conjunction with a thermal radiation detector 1 to provide intruder alarm apparatus. Each lens defines one detection direction in a fan of such directions 26,27,28. Such arrays have been moulded as a curved surface 22 centered on the detector. To reduce moulding costs while maintaining the optical efficiencies of all lenses in the array, a flat array of lenses is provided in which each lens is moulded as an angled facet 30,31,32. The poles 36,37,38 of the lenses lie in a plane.

10 Claims, 5 Drawing Figures

Fig. 3.
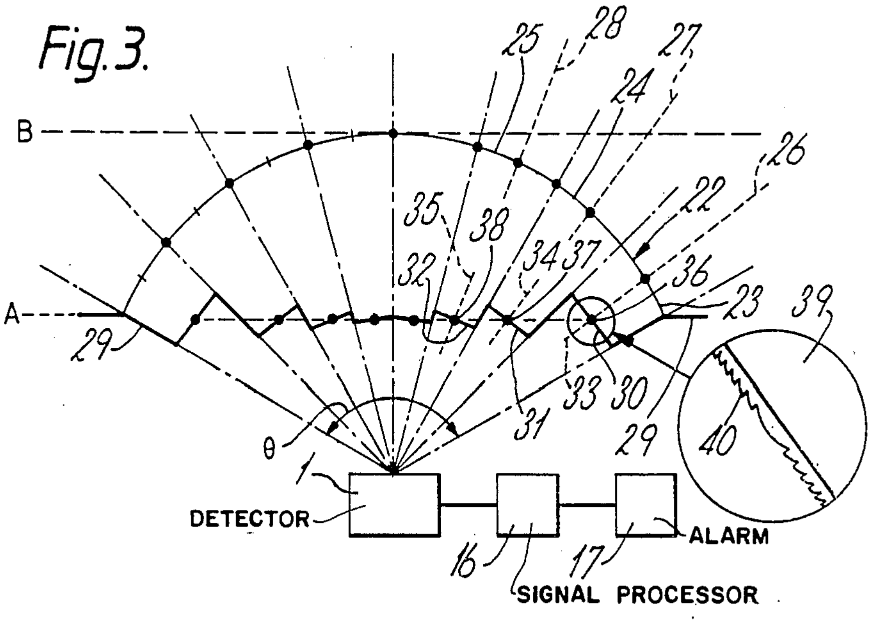
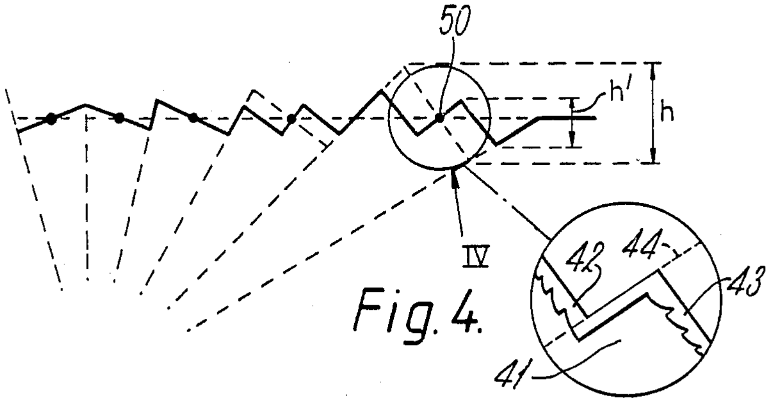
Fig. 4.
Fig. 5.
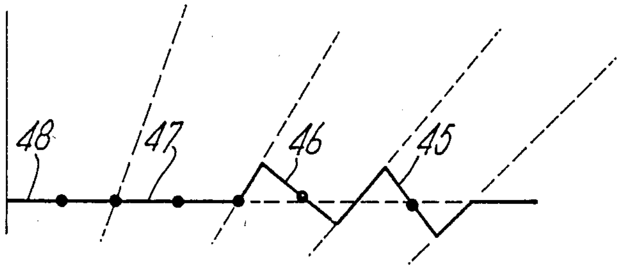

FLAT WIDE-ANGLE LENS ARRAY WITH A COMMON FOCUS

BACKGROUND OF THE INVENTION

The invention relates to an array of lenses for use with a thermal radiation detector to monitor thermal radiation arriving from a fan of separate directions. The pole of each lens and the detector define one detection direction in the fan, the array being formed with the poles of lenses being aligned. Herein, the pole of a lens is defined as the intersection of the optical axis of the lens with the lens element. Hence, a ray incident at the pole passes undeviated through the lens. The line joining the pole and the detector thus defines a detection direction.

In apparatus for monitoring thermal radiation, and in particular in an intruder alarm apparatus, the fan of separate directions should cover at least 90 degrees of azimuth, and preferably 120°, and up 45 degrees in elevation from a horizontal direction downward. Such an apparatus placed high in the corner of a rectangular room, for example, will effectively cover the whole volume of the room.

Desirably, the radiation collection efficiencies of all the lenses in the array are equal so that all directions in the fan are equally covered. Monitoring apparatus is known in which the lenses are provided on a curved surface, the curve being centered on the detector. Each lens in the array is then normal to its detection direction in at least one azimuth. Each lens then forms its image on its optical axis and aberrations are minimized.

It is known to provide the array of lenses by a moulding operation performed on a sheet of plastic material and to form the lenses as Fresnel lenses thereby minimizing the thickness of the sheet. However, such a thin curved sheet protruding from the apparatus is vulnerable to damage. A flat or quasi-flat array of lenses is desirable in fabrication and in the fixing arrangements of the array to the apparatus. A flat lip on the edges of the array can more easily form part of the external wall of a rectangular housing for the apparatus.

Flat arrays of lenses provided on a sheet are known from U.S. Pat. No. 3,547,546 where the lenses are zone plates. However, if zone plates are used 45° off-axis, as is necessary in the present intruder alarm apparatus, the image quality would be greatly degraded and radiation loss due to reflection would reduce the efficiency of such a lens. If the lenses of the array are Fresnel lenses, 45° off-axis operation would again produce loss of radiation by reflection at the outer surfaces of the lens and also by total internal reflection within the Fresnel elements of the lens.

Arrays of moulded Fresnel lenses are also known from U.S. Pat. No. 4,321,594. But therein, to achieve a fan of separate directions, the moulded sheet is substantially curved or bent and hence protrudes from the apparatus indesirably as previous noted.

SUMMARY OF THE INVENTION

It is an object of the invention to provide a flat array of lenses for a thermal radiation detection apparatus which maintains the efficiences of all lenses in the array substantially equal in spite of the pronounced angle between the array and the outermost detection directions.

The invention provides an array of lenses for directing radiation from a pluality of arcuately displaced directions onto a single detector, characterized in that the lenses are angle facets formed as deformations in a quasi-flat sheet of radiation transmissive material. Each facet is substantially normal to the optical axis of its respective lens, the optical axis of each lens passing through the detector. The poles of said lenses lie substantially in a single plane.

The lenses of the array which are inclined at progressively larger angles to the sheet may be larger in extent and might have required larger deformations in the sheet. To obviate this, the invention may also be characterized in that a facet is divided into two semi-facets by a line through the pole, the semi-facets being displaced relative to one another along the optical axis of the lens of the facet so as to reduce the height of the deformation.

BRIEF DESCRIPTION OF THE DRAWING

Embodiments of the invention will now be described, by way of example, with reference to the accompanying drawings in which:

FIG. 3 shows a horizontal section through an array of lenses in accordance with the invention, FIG. 4 shows an alternative form of lens facet for use in the array of FIG. 3, and FIG. 5 shows a compromise array in which flatness is improved at the expense of some radiation collection efficiency.

DESCRIPTION OF THE PREFERRED EMBODIMENTS

Figure 1:
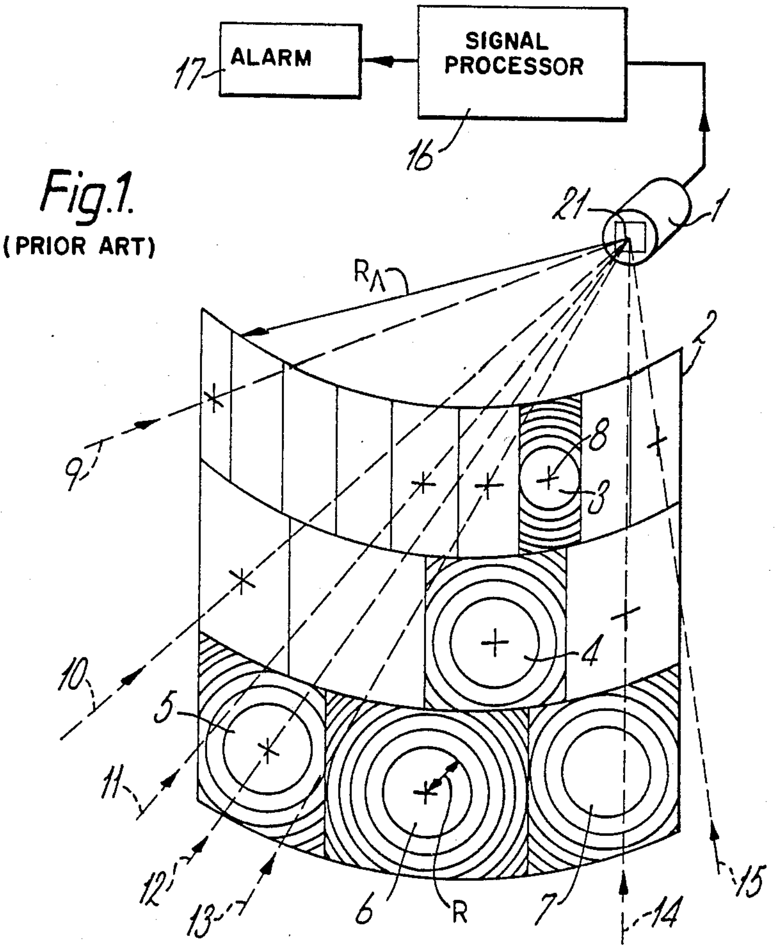
Fig.1. (PRIOR ART)
FIG. 1 shows a known passive infrared intruder alarm system.

Referring to FIG. 1 which shows a known type of passive infrared intruder alarm, a pyroelectric infrared detector 1 is placed on the axis of curvature of a cylindrical single sheet substrate 2. The substrate comprises an array of Fresnel lenses, lenses 3, 4, 5, 6, and 7 each being shown schematically as a pattern of rings, there being a total of sixteen lenses in this embodiment.

Each lens is a positive lens, focusing thermal radiation from a distant source onto the detector. The pole of each lens, pole 8 in the case of lens 3 for example, taken with the receptive area 21 of the detector, defines one detection direction of a fan of directions 9, 10, 11, 12, 13, 14 and 15 for example. From each direction radiation is focused onto the detector by the respective lens.

Fluctuations in the amount of radiation in the wavelength range of 6 to 14 microns falling upon the detector, due, for example, to an intruder crossing one of the directions, gives rise to an output signal from the detector. This signal is analysed in a signal processor 16 which applies predetermined criteria to the signal before raising an alarm in a visual or audible alarm device 17.

Figure 2:
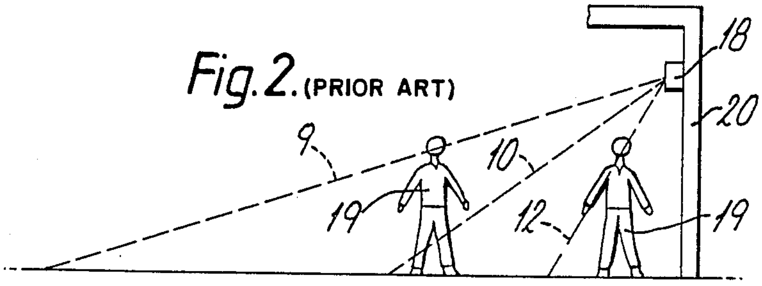
Fig.2. (PRIOR ART)
FIG. 2 shows a side view of the system of FIG. 1 illustrating the range of directions covered in a vertical plane.

FIG. 2 shows a intruder alarm 18 as described above attached to a wall 20 above the height of a human intruder 19. The directions 9, 10 and 12 in a vertical plane provide coverage for distant, middle and close ranges respectively from the wall. Coverage in azimuth is provided for each range by the associated horizontal row of zone plates, for example zone plates 5, 6 and 7 of FIG. 1 for the close range.

In more detail, detector 1 comprises a pyroelectric detector element formed from a body of pyroelectric material, for example a ceramic material such as lanthanum and manganese doped lead zirconate titanate for which referece is made to British Patent Specification No. 1 504 283. Reference is also made to British Patent Application No. 8421507 for details of a detector encapsulation comprising such a pyroelectric element behind a silicon window on which a Fresnel lens is provided to concentrate incoming thermal radiation onto the detector element. The encapsulation also comprises a field effect transistor to couple the very high output impedance signal source of the element to external circuitry. Such a detector is sensitive only to changes in the intensity of incident thremal radiation and effectively comprises an a.c. coupled signal source. The above Patent Application also describes the application of such a detector to passive infrared intruder alarms.

The sheet substrate 2 is of a plastic material transparent to thermal radiation, for example polyethylene at a thickness of 0.5 mm. Polyethylene is particularly suitable for this component as it is light, heat formable and transmits radiation wavelengths greater than 5 microns. The lenses are formed as deformations in the surface of the polyethylene sheet. The sheet is also curved into a cylinder of radius $R_A$ which is substantially equal to the focal length of the lenses in the upper row of lenses. Such an array of lenses is desirable in that, at least for the upper row of lenses, the lens surfaces are largely normal to their respective detection directions and consequently loss of radiation by reflection at the outer surfaces of the sheet and by total internal reflection within the Fresnel elements of each lens is minimized.

However, a flat or quasi-flat array of lenses is desirable in fabrication and in the fixing arrangements of the array to the intruder alarm apparatus. A flat lip on the array can more easily form part of the external wall of a rectangular housing. Also, if the array is positioned flush in a wall of the housing or slightly recessed the possibility of damage to the array is reduced in comparison with that of a protruding cylindrical or spherical array.

Referring to FIG. 3, there is shown an array of lenses in accordance with the invention. A horizontal section is shown through the upper row of lenses of an apparatus corresponding to that shown in FIG. 1. In FIG. 3 arc 22 is a horizontal section of the cylindrical array of lenses 2 of FIG. 1, the lenses 23, 24 and 25 each being normal to their respective detection directions 26, 27 and 28.

In accordance with the invention the sheet of material 29 in which the Fresnel lenses are formed is quasi-flat. Each of the lenses 30, 31 and 32 are formed as facets so that their optical axis 33, 34 and 35 coincide with their respective detection directions 26, 27 and 28. The respective poles 36, 37 and 38 are aligned, in this case in a plane which also contains the poles of the lenses in the middle and lower rows of lenses.

At 39 there is shown an enlargement of one Fresnel lens 30 by way of example. The sheet of material 29 is locally deformed out of the alignment direction of the poles to form a facet that is parallel to the corresponding chords of lens 23 in the curved array 22. A conventional Fresnel lens 40 is formed as a profile on the inner surface of the sheet facing detector 1, the outside surface of the sheet being flat. Thus each Fresnal lens is normal to the direction of incident radiation which will be focused by that lens onto the detector. Reflection losses, both external and internal, at each lens are therefore minimized.

Ideally, each angled lens facet needs to be parallel to the tangent at the centre of the original (conventional) lens, this ensuring minimum light loss. In practice, the facets need not correspond exactly to the original curve and, by having less steep facets, a flatter device can be produced.

In general, because the outer elements of a flat or quasi-flat array are unavoidably more distant from the detector, the position of the object point for sharp focussing and/or the object magnification will not be the same as in the equivalent curved array. Clearly, the object, for example an intruder, may lie anywhere within a specified range, so that, in general, the image of the intruder will not be in focus at the detector. As long as sufficient radiant energy is collected, however, detection is achieved.

The position of the equivalent straight Fresnel lens can be conveniently between planes A and B, B being tangent to the original curved array. In order to maintain a similar field of view ($\theta$) when in position B, the lens becomes very extended and may no longer be self-supporting. However, to keep the lens focal lengths close to presently available values, dictates that the plane needs to be positioned near 'B'. Positioning at or near B also has the advantage of increasing the widths of the outer elements which serves to compensate for the oblique incidence at the detector. The focal length of each lens may be chosen so as to image object points which are equidistant from the array. Alternatively, the focal lengths can be selected so that the image sizes produced by all the lenses from equidistant objects are the same as the images that would be produced by an equivalent curved array.

FIG. 4 shows an alternative form for the more sharply angled lenses which reduces the height h of the deformation of the sheet. At 41 there is shown an enlargement of a lens facet which has been divided into two semi-facets 42 and 43 by a line 50 normal to the optical axis 44 and which passes through the pole of the lens normal to the plane of the drawing. The semi-facets are displaced relative to one another along the optical axis so that the height h' of the deformation is reduced. The two semi-facets can be chosen to have equal focal lengths or may have focal lengths in proportion to their distance from the detector.

FIG. 5 shows a section of a sheet in which only the more sharply angled lens facets 45 and 46 are formed as deformations in the sheet. The less sharply angled lens facets 47 and 48 are formed without deforming the sheet. The imaging of these lenses is off-axis to some extend with consequent loss of collection efficiency. However, sharp imaging is not required, owing to the finite size of the detector, and these losses can be tolerated.

In all the previous descriptions, the lenses have been Fresnel lenses. Diffracting elements, such as zone plates, which function as lenses may be used in their place.

The conventional zone plate, first described by Fresnel in the year 1816, is described on page 283 of the textbook "Geometrical and Physical Optics", 2nd Edition, by R. S. Longhurst, published by Longman. This zone plate comprises a sequence of concentric circular zones on a flat sheet, the sequence comprising alternate transparent and opaque zones. The radii of successive zones are proportional to the square roots of the natural numbers so that the areas of all zones are equal. A radiation wavefront incident on the zone, plate is diffracted by the transparent zones and alternate zones of the wavefront are removed by the opaque zones. The transmitted zones of the wavefront interfere constructively at a point analogous to the focal point of a simple positive lens.

The focal length F of a zone plate is given by $R^2/\lambda$ where R is the radius of the first zone, i.e. the central circular area of the pattern, and $\lambda$ is the wavelength. Higher radiation transmitting efficiency is achieved if the opaque zones are replaced by transparent zones which produce a phase reversal, i.e. a path length difference of $\lambda/2$, relative to adjacent zones. Some incident radiation is directed to subsidiary, or higher order, foci having focal lengths of F/3, F/5, F/7 etc. Most of this radiation can be directed on to one primary focus if the relief structure of each zone has an appropriate profile or blaze angle.

Thus the zone plate can be made to operate as an efficient lens and can also be formed as a relief pattern of rings on the sheet surface. The pattern height, however, is much less than in a conventional Fresnel lens.

A typical pyroelectric detector may have a total detector area of 2.1 mm by 2.8 mm, divided into two detectors operated in a differential detection mode. A typical focal length for a lens at the centre of the array is 30 mm, increasing to 40 mm for the outside, more sharply angled lenses.

I claim:

1. An array of lenses for directing radiation from a plurality of arcuately displaced directions onto a single point-like image region, characterized in that the lenses are angled facets formed as deformations in a quasi-flat sheet of radiation transmissive material, in that each facet is substantially normal to the optical axis of its respective lens, the optical axis of each lens passing through the image region, and in that the poles of said lenses lie substantially in a single plane.

2. An array as claimed in claim 1, characterized in that a facet is divided into two semi-facets by a line through the pole, the semi-facets being displaced relative to one another along the optical axis of the lens of the facet so as to reduce the height of the deformation.

3. An array of lenses as claimed in claim 1 or claim 2, characterized in that the lenses are Fresnel lenses.

4. An array of lenses as claimed in claim 1 or claim 2, characterized in that the lenses are zone plates.

5. Apparatus for monitoring thermal radiation arriving from a fan of separate directions, comprising a thermal radiation detector, an array of lenses, one lens for each direction, and circuit means for processing an output signal from the detector to detect changes in the thermal radiation incident upon the detector, characterized in that the array of lenses are angled facets formed as deformations in a quasi-flat sheet of radiation transmissive material, in that each facet is substantially normal to the optical axis of its respective lens, the optical axis of each lens passing through the image region, and in that the poles of said lenses lie substantially in a single plane.

6. Apparatus as claimed in claim 5 characterized in that the detector is a pyroelectric infrared detector.

7. A lens array for directing radiation from a plurality of directions onto a point-like image region, said lens array comprising:

a quasi-flat sheet of radiation-transmissive material; and an array of lenses provided in the sheet of radiation-transmissive material, each lens comprising an angled facet formed in the sheet of radiation-transmissive material, each lens having an optical axis which is substantially perpendicular to the facet of the lens, the optical axes of all of the lenses passing throught he point-like image region, each lens having a pole, the poles of all of the lenses being arranged substantially in a single plane.

8. A lens array as claimed in claim 7, characterized in that each lens has a focal point which is arranged substantially at the point-like image region.

9. A device for detecting thermal radiation from a plurality of directions, said device comprising:

a point-like thermal radiation detector; and a lens array for directing radiation from a plurality of directions onto the point-like detector;

characterized in that the lens array comprises:

a quasi-flat sheet of radiation-transmissive material; and an array of lenses provided in the sheet of radiation-transmissive material, each lens comprising an angled faced formed in the sheet of radiation-transmissive material, each lens having an optical axis which is substantially perpendicular to the facet of the lens, the optical axes of all of the lenses passing through the point-like detector, each lens having a pole, the poles of all of the lenses being arranged substantially in a single plane.

10. A device for detecting thermal radiation as claimed in claim 9, characterized in that each lens has a focal point which is arranged substantially at the point-like detector.

* * * * *